(12) United States Patent
Haeusler

(10) Patent No.: US 11,908,164 B2
(45) Date of Patent: Feb. 20, 2024

(54) AUTOMATIC EXTRINSIC CALIBRATION USING SENSED DATA AS A TARGET

(71) Applicant: EMBARK TRUCKS, INC., San Francisco, CA (US)

(72) Inventor: Phillip Haeusler, San Francisco, CA (US)

(73) Assignee: EMBARK TRUCKS INC., San Francisco, CA (US)

( * ) Notice: Subject to any disclaimer, the term of this patent is extended or adjusted under 35 U.S.C. 154(b) by 258 days.

(21) Appl. No.: 17/383,504

(22) Filed: Jul. 23, 2021

(65) Prior Publication Data
US 2023/0028484 A1   Jan. 26, 2023

(51) Int. Cl.
| | | |
|---|---|---|
| *G06T 7/80* | (2017.01) |
| *G06V 20/56* | (2022.01) |
| *B60R 11/04* | (2006.01) |
| *G01S 7/497* | (2006.01) |
| *H04N 17/00* | (2006.01) |
| *G01S 17/86* | (2020.01) |

(52) U.S. Cl.
CPC ............... *G06T 7/80* (2017.01); *B60R 11/04* (2013.01); *G01S 7/497* (2013.01); *G01S 7/4972* (2013.01); *G01S 17/86* (2020.01); *G06V 20/588* (2022.01); *H04N 17/002* (2013.01); *G06T 2207/30256* (2013.01)

(58) Field of Classification Search
CPC . G06T 7/80; G01S 17/86; G01S 7/497; G01S 7/4972; G06V 20/588; B60R 11/04; H04N 17/002
USPC ........................................................ 348/148
See application file for complete search history.

(56) References Cited

U.S. PATENT DOCUMENTS

2019/0353784 A1* 11/2019 Toledano ............. G05D 1/0212

* cited by examiner

*Primary Examiner* — Nguyen T Truong
(74) *Attorney, Agent, or Firm* — Buckley, Maschoff & Talwalkar LLC

(57) ABSTRACT

Provided are systems and methods for auto calibrating a vehicle using a calibration target that is generated from the vehicle's sensor data. In one example, the method may include receiving sensor data associated with a road captured by one or more sensors of a vehicle, identifying lane line data points within the sensor data, generating a representation which includes positions of a plurality of lane lines of the road based on the identified lane line data points, and adjusting a calibration parameter of a sensor from among the one or more sensors of the vehicle based on the representation of the plurality of lane lines.

20 Claims, 15 Drawing Sheets

200B

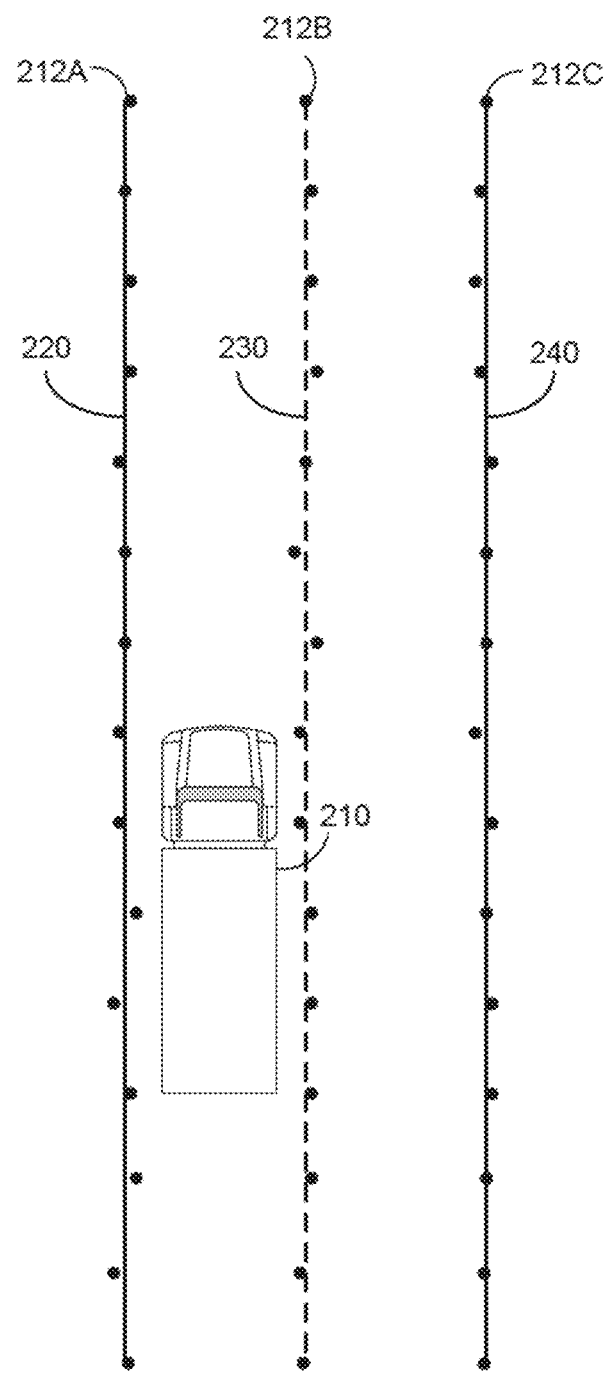

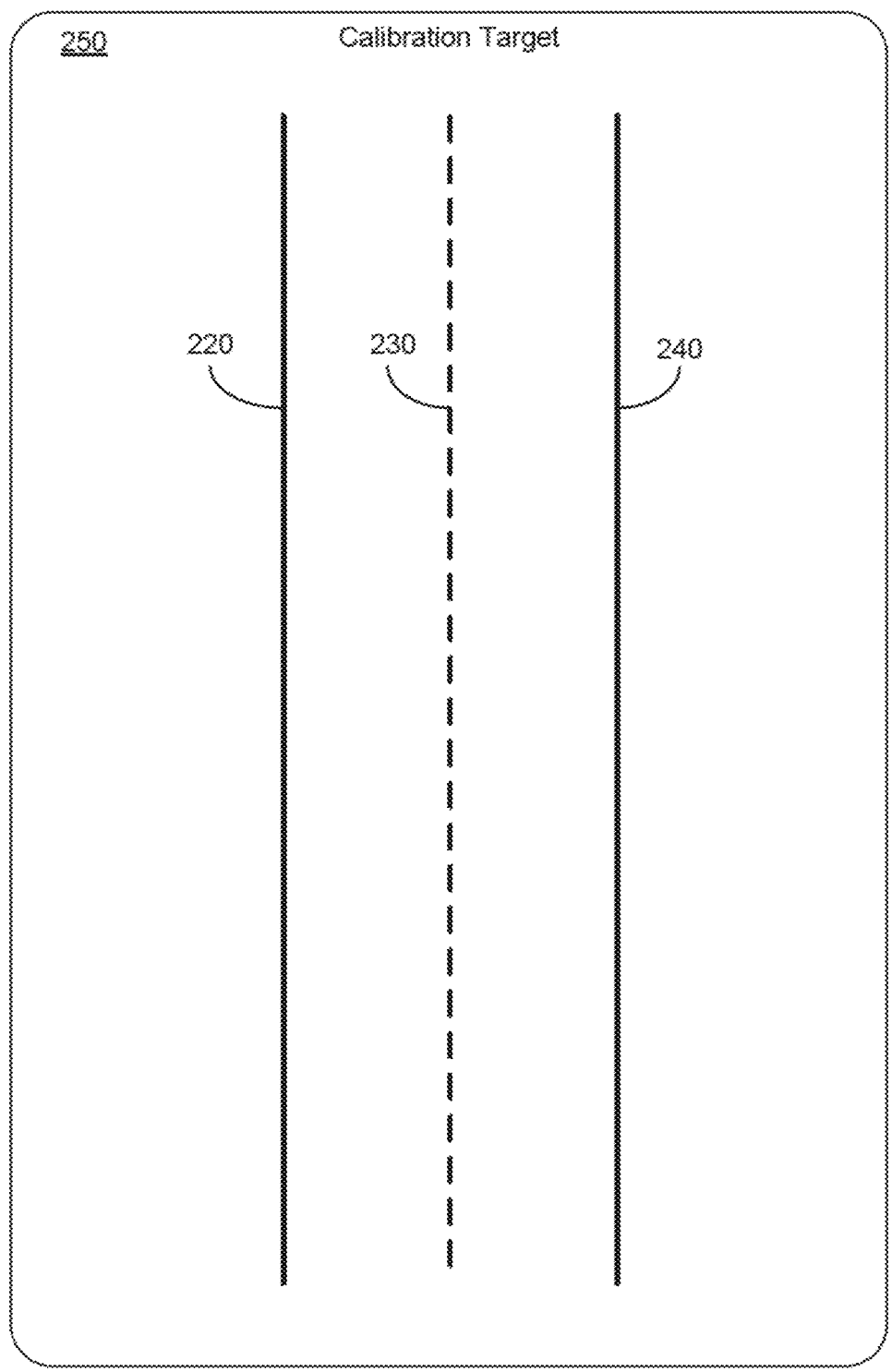

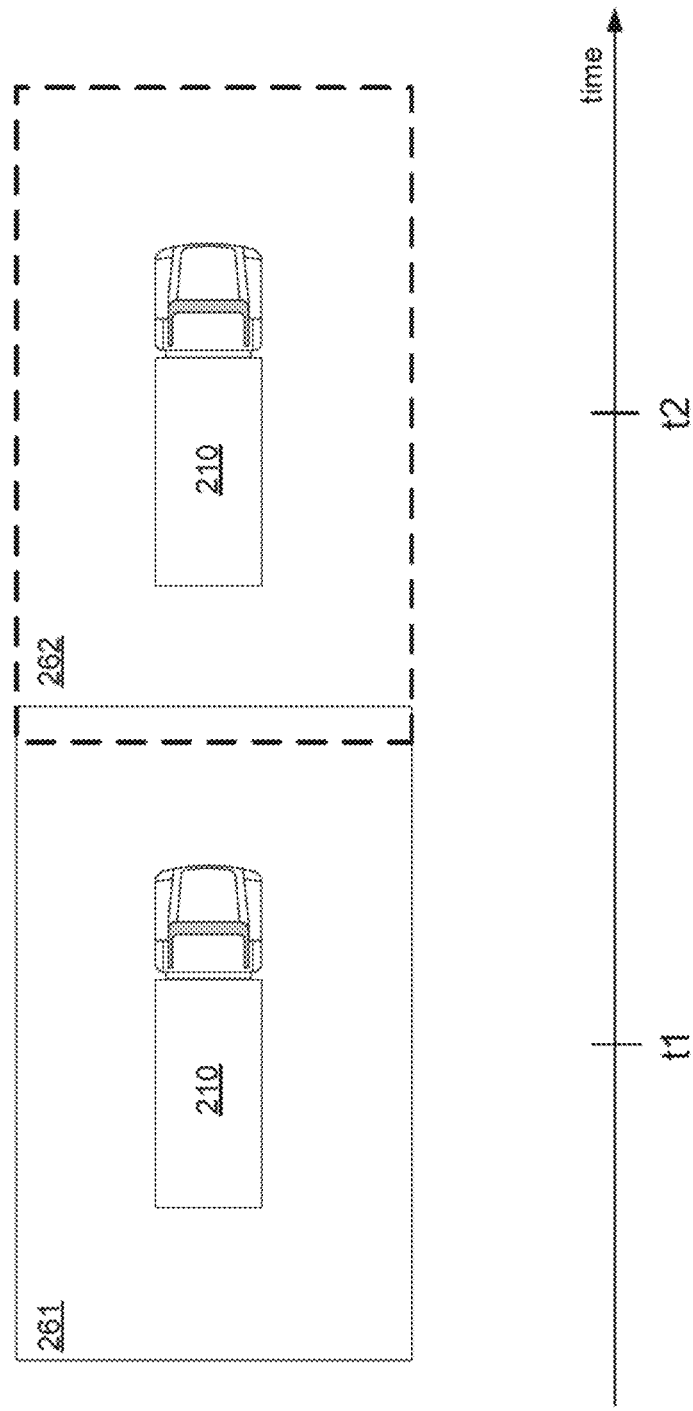

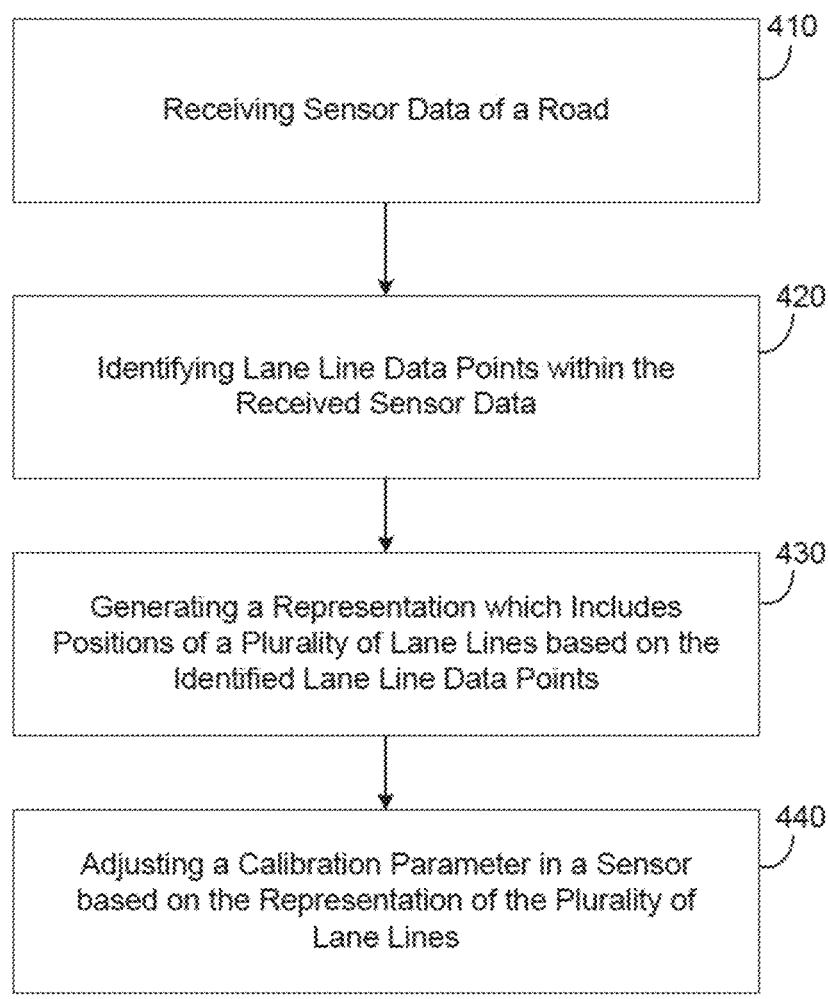

AUTOMATIC EXTRINSIC CALIBRATION USING SENSED DATA AS A TARGET

BACKGROUND

An autonomous vehicle relies on sensors such as cameras, lidars, radars, inertial measurement units (IMUs), and the like, to understand the road and the rest of the world around the vehicle without requiring user interaction. Sensor calibration informs the vehicle's computer about the positioning and the orientation of the sensors on the vehicle within a high degree of accuracy. This allows the vehicle to understand its position within the world by bringing the sensor readings into a common coordinate frame. Accurate calibration can be critical for localization, perception (computer vision), control, mapping, and the like. Without proper calibration, an autonomous vehicle will have trouble staying within its lane as well as additional problems such as steering and object recognition.

A typical vehicle calibration process is performed while the vehicle is perched on a rotating substrate within a room filled with targets. In this case, the rotating substrate is usually surrounded by calibration targets (e.g., paperboard cutouts, etc.) arranged in such a way that they cover the field of view of the camera(s) and the lidars of the vehicle. As the substrate turns (as well as the vehicle on top of it), the onboard software system of the vehicle scans the exterior paperboard targets and calibrates its sensors. However, this process is only capable of being performed while the vehicle is parked and rotating on a substrate within a room that has been filled with targets. Accordingly, what is needed is a more efficient way for calibrating the sensors of a vehicle.

SUMMARY

The example embodiments overcome the drawbacks of the traditional calibration process by building a calibration target from sensor data that is captured of the road (e.g., in front of the vehicle) while the vehicle is in motion. For example, sensors from the vehicle (e.g., lidars, cameras, etc.) may capture data while the vehicle is in motion. In response, the vehicle may estimate locations of the road (e.g., lane lines, objects, etc.) and build a representation of the road based on the estimated locations of the road. Furthermore, the vehicle may perform calibration (e.g., alignment, etc.) of the sensors using the multi-dimensional calibration target according to certain embodiments. In this way, both the construction of the calibration target and the calibration based on the calibration target can be performed at the same time, using the same interval of sensor data. Some of the benefits of the example embodiments include the ability to calibrate the vehicle in real time, without the vehicle being removed from the road and loaded onto a rotating substrate within a room filled with targets. Instead, the vehicle can build its a calibration target from sensor data (e.g. lidar data) that is sensed while the vehicle is driving down the road, and the vehicle's computer can calibrate the sensors of the vehicle (e.g., translation, rotation, etc.) based on the built calibration target from these extrinsic sensor readings.

According to an aspect of an example embodiment, provided is a computing system that may include a memory configured to store sensor data associated with a road that is captured by one or more sensors of a vehicle, and a processor configured to identify lane line data points within the sensor data, generate a representation which includes positions of a plurality of lane lines of the road based on the identified lane line data points, and adjust a calibration parameter of a sensor from among the one or more sensors of the vehicle based on the representation of the plurality of lane lines.

According to an aspect of another example embodiment, provided is a method that may include receiving sensor data associated with a road captured by one or more sensors of a vehicle, identifying lane line data points within the sensor data, generating a representation which includes positions of a plurality of lane lines of the road based on the identified lane line data points, and adjusting a calibration parameter of a sensor from among the one or more sensors of the vehicle based on the representation of the plurality of lane lines.

According to an aspect of another example embodiment, provided is a vehicle that may include one or more sensors, a memory configured to store sensor data associated with a road that is captured by the one or more sensors while the vehicle is in motion, and a processor configured to generate a calibration target from the sensor data associated with the road while the vehicle is in motion and adjust a calibration parameter of a sensor from among the one or more sensors based on the generated calibration target.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2D are diagrams illustrating a process of generating a calibration target from the road in accordance with an example embodiment.

FIG. 2E is a diagram illustrating a process of estimating a ground plane in accordance with an example embodiment.

FIG. 4 is a diagram illustrating a method for calibrating vehicle sensors from on-road sensor data in accordance with an example embodiment.

Figure 1A:
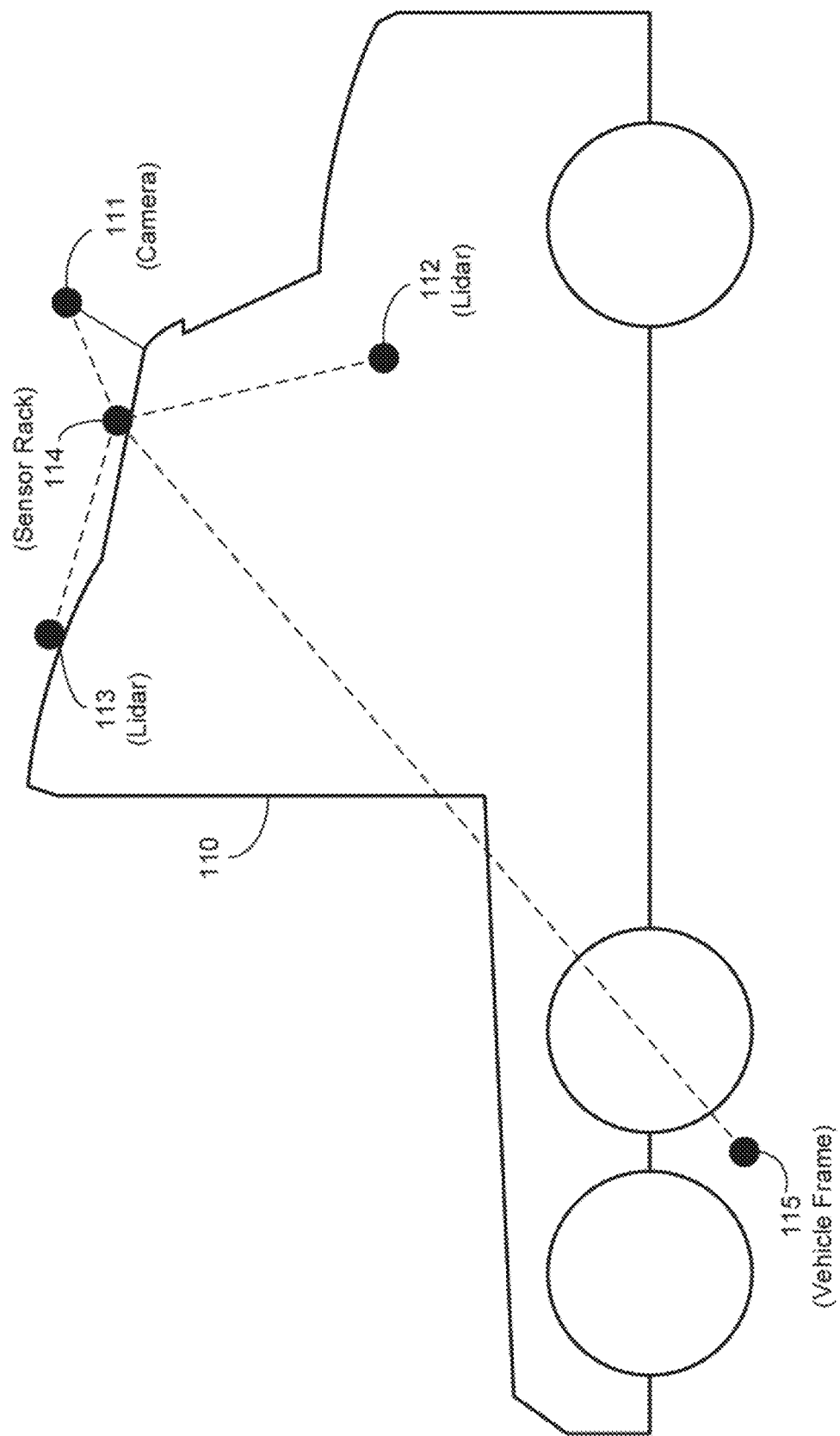
FIG. 1A is a diagram illustrating an example of coordinate definitions of a vehicle in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein.

Light detection and ranging (lidar) sensors are used by vehicles to measure a surrounding area by obtaining a sparse point cloud using distances to points in the point cloud that are measured by light beams from the lidar sensors. The illumination works independently from ambient light and can be used in any conditions. Furthermore, the lidar sensors can capture data that can be used to generate a map of the world in three-dimensions (3D). Radio detection and ranging (radar) sensors are used by vehicles to identify objects and other obstacles around the vehicle. The radar sensors may emit electromagnetic waves that reflect (and return reflected waves) when they meet the obstacle. Meanwhile, vehicle cameras can capture images (e.g., RGB images, black and white images, etc.) of the world around the vehicle and provide complimentary data to the lidar data captured by the lidar sensors. For example, cameras can capture data such as color, texture, appearance, etc., while lidar is able to capture and model structural aspects of the data. The lidar sensors, radar sensors, and cameras are exemplary sensors in a vehicle as described herein such as an autonomous vehicle (AV).

In many vehicles, the perception of the vehicle is created based on a combination (i.e., jointly) of lidar data from the lidar sensors and image data captured by the cameras. For accurate perception, these two systems must be aligned with respect to each other. Lidar calibration according to an exemplary embodiment can be performed to align a coordinate frame of a lidar sensor(s) with a coordinate frame of a camera by changing extrinsic parameters such as rotation and translation between the coordinate frames of the lidar sensor and the camera. These extrinsic parameters can be used to fuse information together from the lidar sensors and the image sensors when visualizing the vehicle interprets visual data from the road.

Traditionally, the calibration of lidar and cameras may be performed by a technician manually moving targets around a vehicle. Another traditional calibration technique is for a user to place targets around a track and have the vehicle drive around the track while capturing pictures of the targets. A more sophisticated calibration setup would rely on parking the vehicle on a rotating substrate within a room filled with targets and turning the substrate while the sensors of the vehicle capturing images/lidar of the various targets within the room. The targets, in this case, are often black/white checkerboards or other predefined shapes such as diamonds, triangles, circles, V-shapes, or even ordinary boxes. The readings of the targets can then be used to calibrate the image plane of the cameras and/or the sensor plane of the lidar sensors. Such a calibration may involve changing the orientation, position, etc., of the cameras and/or the lidar sensors.

According to various embodiments, calibration of vehicle sensors can be performed based on an internal calibration target that is generated by the vehicle instead of requiring paperboard targets. The vehicle that can capture sensor data (e.g., images, lidar, etc.) while in movement on a road and use the sensor data to construct a calibration target from an object within the road. The calibration target of the road includes lane lines that are parameterized as a set of polylines (e.g., one polyline per lane). Each polyline may include a sequence of points describing a line. The calibration target may be saved as a .CSV file, a .JSON file, or the like. For example, the vehicle may construct a 3D map of the lanes (lane lines) on the road based on the lidar data from the lidar sensors and store the map within a .CSV file within a memory of the vehicle's computer. Next, the vehicle may calibrate either of the lidar sensors and/or the cameras with respect to each other based on the 3D map of the lane lines. For example, a translation and a rotation of the lidar sensors and/or the cameras can be modified to align in a common 3D image plane of the vehicle's perception.

FIG. 1A illustrates an example of coordinate definitions of a vehicle 110 in accordance with an example embodiment. In this example, the vehicle 110 is a truck cab but it should be appreciated that the vehicle 110 may be any type of autonomous vehicle (AV) such as a sedan, a van, a bus, or the like. Referring to FIG. 1A, the vehicle 110 includes various nodes 111, 112, 113, 114, and 115 of and around the vehicle 110 that may be used during a calibration of the vehicle 110. Here, node 111 corresponds to a position of a camera on the vehicle 110, node 114 corresponds to a position of a sensor rack that is holding the camera, nodes 112 and 113 correspond to positions of lidar sensors of the vehicle 110, and node 115 corresponds to a vehicle frame and may be used as a point of rotation when performing the calibration and also for measuring the odometry (movement) of the vehicle 110 between sensor reading cycles.

Figure 1B:
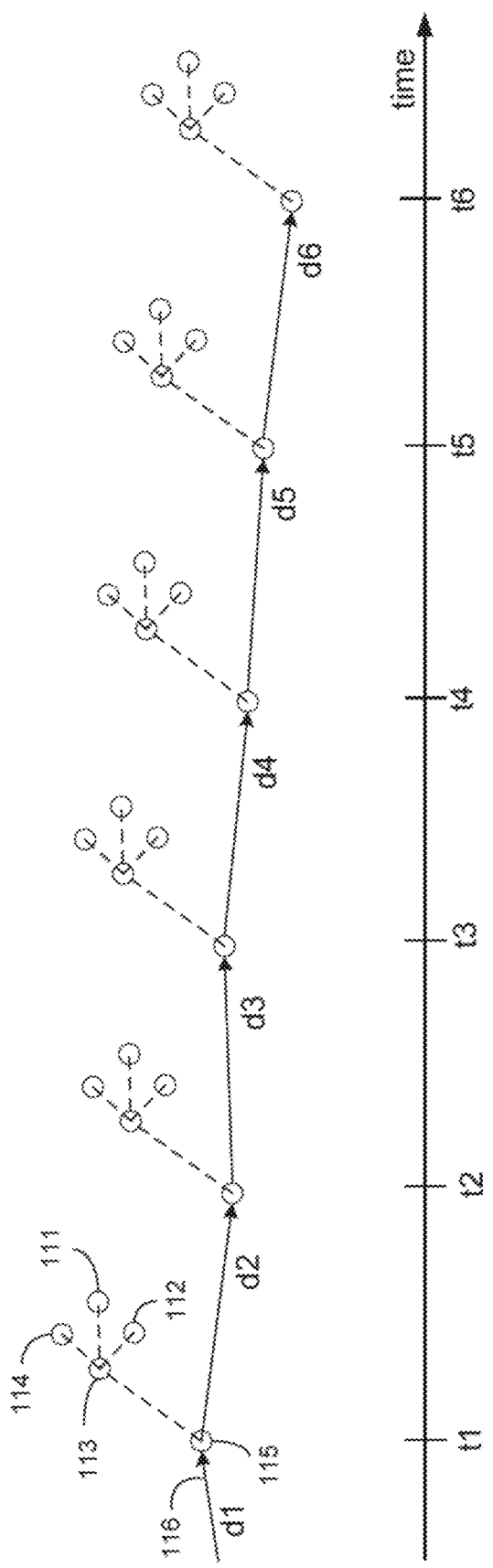
FIG. 1B is a diagram illustrating a factor graph of transformed data of a vehicle in accordance with an example embodiment.

FIG. 1B illustrates a factor graph 120 of sensor data captured by the vehicle 110 shown in FIG. 1A over time in accordance with an example embodiment. In this context the factor graph 120 can be defined as a graphical model used to describe how the cost functions are mathematically setup and interact geometrically with estimated parameters. In this case, the vehicle 110 is estimating the vehicle calibrations and cab pose for each frame. The cost functions are the edges or constraints in the factor graph 120. The example embodiments "solve" the factor graph 120 by a method of non-linear optimization of the parameters using the cost functions to evaluate cost.

Periodically, the vehicle 110 may capture the sensor data and record the measurements in structures including the nodes 111, 112, 113, 114, and 115. That is, during a sensor reading cycle (referred to herein as a frame), the vehicle may capture a reading from each of the sensors and generate a new value for the different nodes 111, 112, 113, 114, and 115, which are stored on the factor graph 120 shown in FIG. 1B. The vehicle 110 may store at least one measurement from each sensor for each frame in the pose graph shown in the example of FIG. 1B. The data is essentially "raw" sensor data. It may not be transformed. The sensors may optionally be hardware synchronized such that they acquire data at exactly the same time and rate. In other embodiments the cameras, lidars, and odometry measurements occur at different rates. Subsequently each frame may contain one image per camera, readings of the individual lidar points between the previous frame time and the current frame time, and odometry readings between the previous frame time and the current frame time. In some embodiments, the vehicle 110 may interpolate between the odometry measurements to find an exact odometry per lidar point time and image time.

The frequency at which the sensor data is captured (i.e., the frequency of the sensor readings) may be based on distance travelled, time elapsed, and the like. For example, a new sensor reading may occur every 1 meter, 3 meters, 10 meters, or the like. In addition to recording the sensor measurements and transforms, the factor graph 120 may also store an odometry value 116 (e.g., the distance traveled) by the vehicle 110 between each of the sensor readings which has a trajectory based on the trajectory of the vehicle 110.

The raw measurement data per frame is stored in the nodes 111, 112, 113, 114, and 115. Furthermore, various cost functions may be executed on the measurement data to estimate the calibrations. Examples of the cost functions include, but are not limited to, an odometry cost function, a cab-to-cab cost function that makes it difficult for the cab transform to change between frames, a lidar to lane line cost function the measures the distance between lidar points and an estimated lane line, a lane curvature cost function that measures the distance between projected lidar points and segmented pixels in the camera, a lidar to ground plane transform cost function which measures the relative orientation and offset from the lidars based on data from a local region around the vehicle, and the like.

In some embodiments, the "lane curvature cost function" may not involve the camera or projected lidar points. Instead, the lane curvature cost function may operate on the virtual calibration target (i.e. the lane line models). It helps to provide a base structure for the estimated lane lines, based on the assumption that in general lanes curve gradually. This could be more sophisticated if required, such as fitting a clothoid model, which is a type of curve used in highway design. Meanwhile, the ground plane transform cost function helps inform of the cab position at each frame.

The different cost functions may be executed simultaneously by the vehicle's computer. The cost functions are part of the calibration process, and enable the vehicle's sensors (e.g., cameras and lidars) to be calibrated while in-motion on the road. For example, the vehicle may consider a change (or delta) in odometry since the previous frame. This makes it expensive to deviate from the recorded change in odometry. So if the truck odometry recorded it moved 1 meter forward and rotated 1 degree to the left between two frames (i.e. the delta), it would be expensive to do otherwise during the optimization. The final cost function may be the camera cost function. This cost function projects lane points into the image and scores how well they align with the pixels that have been labeled as lane lines by the image segmentation.

As further described herein with respect to FIGS. 2A-2E, a calibration target may be generated from the sensor data captured of the lane lines on the road where the vehicle is travelling. The calibration target may include a multi-dimensional image in which the estimated lane lines are represented as 3D polylines. For example, the lidar data points captured by the vehicle's lidar system may be filtered to select lidar data points that are likely to be lane lines using a lane line detector which is further described with respect to FIG. 2B. The selected lidar data points can be incorporated into a 3D virtual model or representation. Here, the lane lines may be 3D polylines of lidar data points. The remaining lidar points not considered to be lane lines can be removed from the 3D virtual model. The vehicle's computer may assign an ID per lidar point associating it to a tracked lane line from among a plurality of lane lines in the virtual representation.

Next, the virtual model of the lane lines are used in the optimization to provide a reference to which all lidars are aligned. Because lidar data is sparse (a set of points) it can be difficult to align one lidar sensor with another. However, in the example embodiments, by estimating the lane lines in a 3D virtual space, the vehicle's computer can align lidar points to these lines, which results in alignment between lidars. In this case, the vehicle may estimate the lane lines and the lidar calibrations simultaneously. Furthermore, the cameras may be calibrated by projecting lidar points back into an image of the lane lines captured by the cameras, and scoring the camera alignment to lane lines in the image. As a result the calibration process relies on first calibrating lidars to properly calibrate the camera. In operation this is done simultaneously.

FIGS. 2A-2D are diagrams illustrating a process of generating a calibration target 250 from the road in accordance with an example embodiment. In these examples, a virtual calibration target 250 is constructed from lidar data points that are sensed by lidar sensors installed on or otherwise associated with a vehicle. The calibration target 250 can then be used to calibrate both the lidar sensors on the vehicle and the camera(s), or other imaging elements on the vehicle. That is, an extrinsic calibration of the vehicle's cameras and lidar sensors can be performed without having to take the vehicle off the road and place it on a rotating slab while images are captured of paperboard cutout targets. Instead, the calibration can be performed based on a calibration target 250 that is created virtually by the vehicle based off of data sensed from a road on which the vehicle is travelling (i.e., while the vehicle is in motion in real time). This calibration is significantly more efficient than the related calibration techniques which require physical/printed calibration targets and a rotating slab on which the vehicle must be perched while capturing images of the printed calibration targets. As a result, the calibration is performed in real time on the same data that is being captured by the vehicle while it is in motion.

Figure 2A:
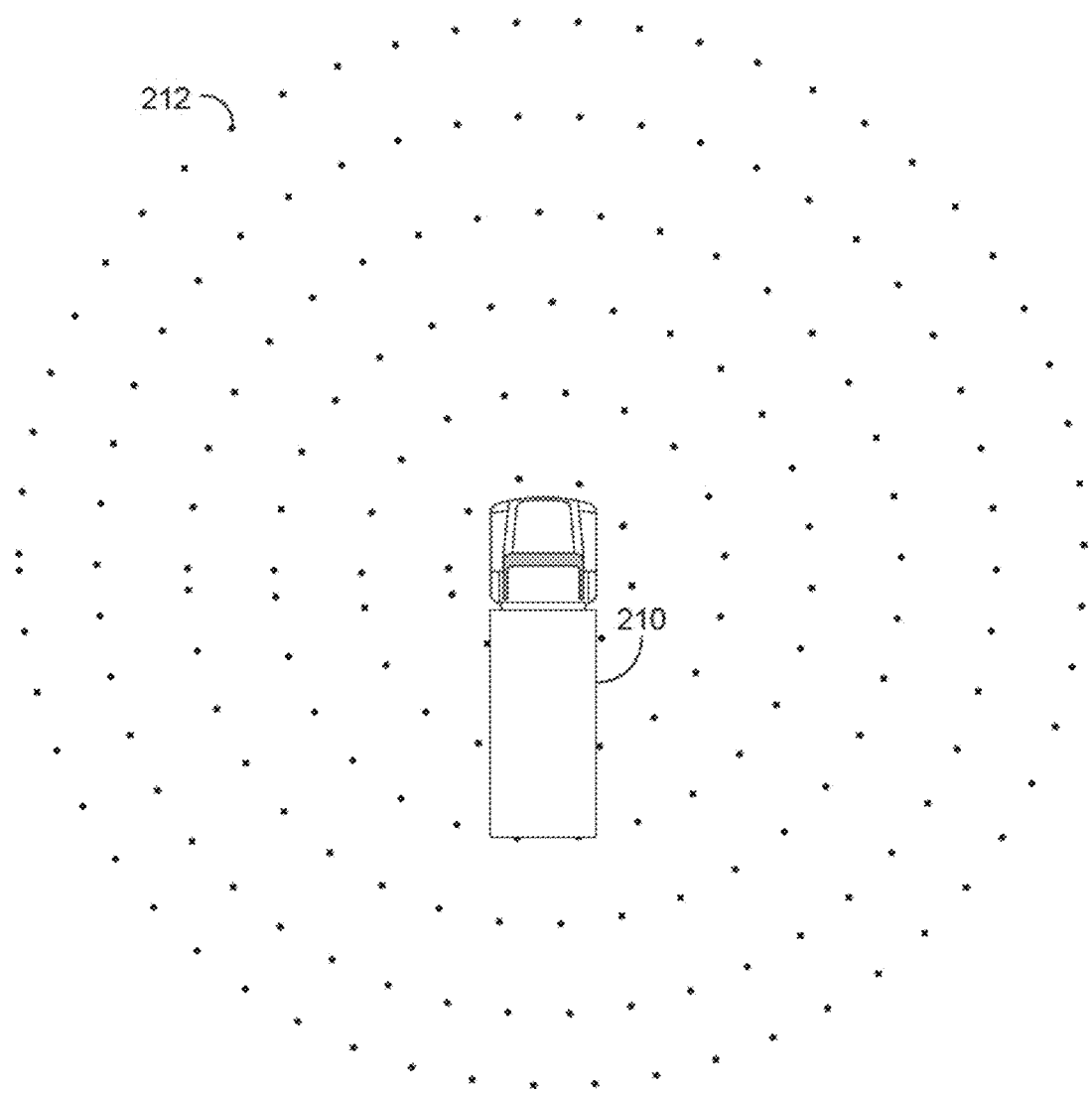

FIG. 2A illustrates a process 200A of a vehicle 210 capturing lidar points 212 around the vehicle 210. Referring to FIG. 2A, the vehicle 210 may be travelling on a road (not shown) such as an interstate, a highway, a city block, or the like. Here, the vehicle 210 may be equipped with lidar sensors capable of detecting lidar points 212 around the vehicle in all directions. For example, the lidar points 212 may be captured periodically or at predetermined intervals referred to herein as frames. The lidar points 212 in each frame may be partially overlapping with a previous frame thereby creating a continuous plane of lidar points using intervals/readings of the lidar sensors. In some embodiments, the vehicle 210 may also capture image data via a camera (not shown) at the same intervals as the lidar points are captured. Thus, the vehicle 210 may accumulate both the lidar points 212 of the road and images of the road as the vehicle 210 continues its journey along the road. The captured lidar points 212 may be stored in the factor graph 120 shown in FIG. 1B.

Figure 2B:
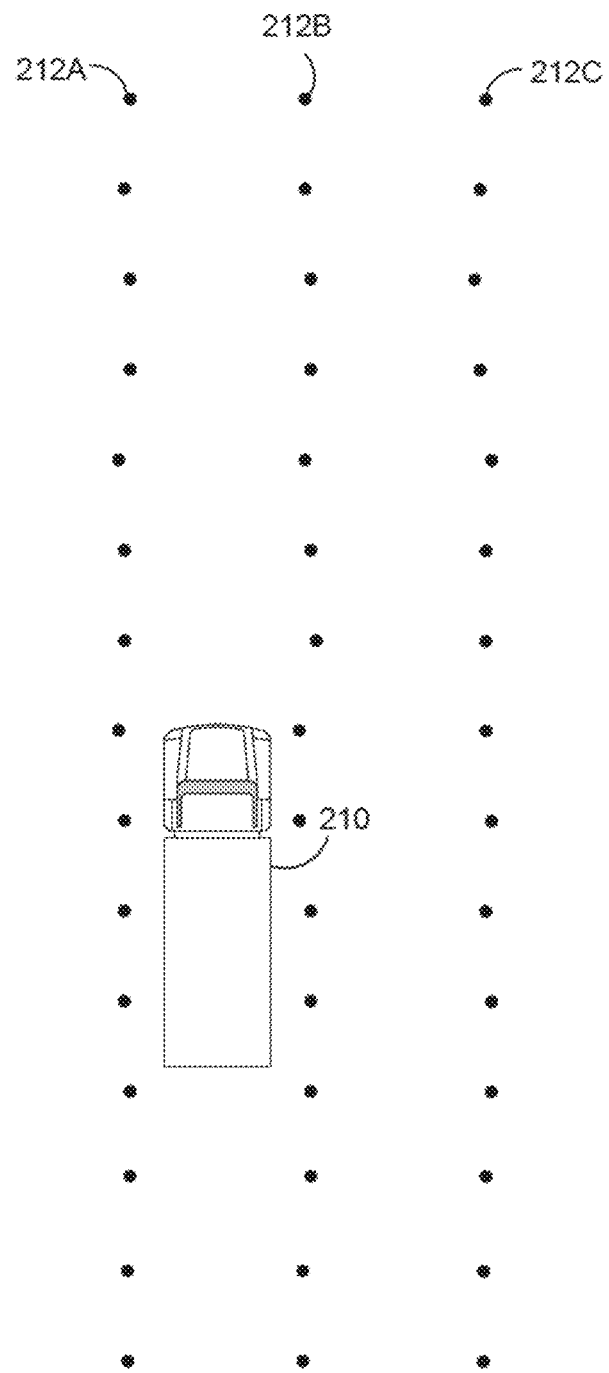

FIG. 2B illustrates a process 200B of the vehicle 210 detecting lidar points that are located near lane lines. Referring to FIG. 2B, the vehicle 210 (e.g., the vehicle's computer) may detect lidar points 212A, 212B, and 212C that correspond to lane lines of the road based on the lidar points 212 captured in FIG. 2A. Here, the vehicle 210 may execute a lane line detector program which selects the lidar points 212A, 212B, and 212C which are likely to be lane lines. Here, the lidar points 212A, 212B, and 212C are only a subset of the lidar points 212. Remaining lidar points that are not selected as lane lines can be discarded or used for determining additional data.

The lane line detector may perform lane line detection (segmentation) from raw lidar data based on different approaches. For example, a first approach is a classic intensity based voxel filter. This filter relies on intensity values per lidar return. This is common for most lidar sensors. The approach works by first grouping all points into 2D voxels (squares) and identifying the brightest points within each voxel. A number of heuristics are then used to identify bright voxels which are generally flat, and have dim neighboring voxels. This works because lane lines are often painted with reflective paint and are on flat ground. All other points are discarded. A second approach is a machine learning mode/neural network for lidar segmentation. In this approach a large amount of lidar data is hand labeled with a class per lidar point. This data is then used to train a neural network to automatically label lidar points. At least one of the labeled classes is lane line. In addition, the machine learning model may also label road surface, signs, poles, etc.

FIG. 2C illustrates a process 200C of the vehicle 210 constructing a calibration target from the detected lidar points 212A, 212B, and 212C. Referring to FIG. 2C, the vehicle 210 builds a calibration target based on the lidar points 212A, 212B, and 212C. Here, the vehicle's computer may estimate lane lines 220, 230, and 240 based on the lidar points 212A, 212B, and 212C, and assign an identifier to each lidar point that is detected as part of the lane lines 220, 230, and 240, associating it to a corresponding lane line. For example, each lidar data point in the lidar points 212A may be assigned an identifier of the lane line 220. Likewise, each data point in the lidar points 212B may be assigned an identifier of the lane line 230 that is different from the ID assigned to the data points in the lane line 220. Likewise, each data point in the lidar points 212C may be assigned an identifier of the lane line 240, which is different from the respective identifiers of assigned to the lidar points assigned to lane lines 220 and 230.

Remaining lidar points (e.g., un-associated lidar points) in a local region around the truck vehicle can be evaluated to determine their distance to a 2D polynomial fit of associated lidar points per estimated lane line. If an un-associated lidar point is a close fit to an existing lane polynomial of a lane line its association is updated to the corresponding lane line. The estimation of the lane lines is part of the calibration process. Here, the vehicle 210 may estimate the location of the lane lines based on the lidar points 212A, 212B, and 212C, and perform the calibration (e.g., shown and described in FIGS. 3A and 3B) at the same time. It is essentially a mapping and calibration problem. Therefore, the same data set may be used to estimate the lane lines 220, 230, and 240, and perform the calibration of the lidar sensors and the cameras based on the lane lines 220, 230, and 240.

FIG. 2D illustrates a process 200D of storing a file including a calibration target 250 which is a multi-dimensional model of the lane lines 220, 230, and 240. Here, the calibration target 250 may be a 3D model of the road/world in which the lane lines 220, 230, and 240 are represented as polylines within the 3D model. The calibration target 250 may be stored as a file in a format of within the computer of the vehicle 210.

FIG. 2E illustrates a process 200E of estimating a ground plane in accordance with an example embodiment. Referring to FIG. 2E, the vehicle 210 can measure the flatness (pitch, roll, and height) of a plane fit to lidar points around the vehicle 210. Here, the vehicle 210 captures "frames" of lidar points. In this example, frames 261 and 262 of lidar points around the vehicle 210 are captured at two successive points in time (t1 and t2). Here, the two points in time (t1 and t2) may be separated by a predetermined or random interval of time such as a half of a second, a few seconds, or the like. Although only two frames are shown, it should be appreciated that many number of frames may be captured by the vehicle's sensors/cameras. In this example, the frames are captured such that the lidar points within an immediately successive frame partially overlaps an immediately previous frame. For example, the lidar points in the frame 262 may partially overlap in geolocation with the lidar points in the immediately previous frame 261.

Here, the frames 261 and 262 are an aligned set of data. Each frame 261 and 262 contains an image (or images) and a set of lidar points taken between the previous image time and the current image time. Per frame, the vehicle's computer may select all lidar points within a region of interest around the vehicle 210 and close to the ground. The vehicle 210 may then fit a ground plane to this data using an iterative random sample consensus (RANSAC) plane fit. This plane is an estimate of the ground flatness (roll, pitch, etc.). As an example, the system vehicle may estimate a pitch, roll, and height offset from the nominal ground. This is used in a cost function to help estimate the cab pose for that particular frame. The vehicle may also estimate a cab pose per frame, and a single cab to sensor calibration per sensor. To constrain the cab pose from being wildly different each frame the vehicle may use a new cab-to-cab cost function. This cost function makes it expensive for consecutive cab poses to deviate significantly.

The estimate of the ground flatness may be used with the lane lines 220, 230, and 240, to calibrate the camera(s) and the lidar sensors of the vehicle 210. In some embodiments, the vehicle 210 is a truck. Here, the truck cab may be suspended on a set of airbags. As the truck drives over bumps the cab moves. Each frame, the vehicle may estimate the cab motion to better estimate the sensor calibrations. Looking at the ground around the vehicle and estimating its orientation helps to solve for the cab motion.

Based on the lane lines 220, 230, and 240 shown in FIG. 2D, and the ground flatness estimates in FIG. 2E, the vehicle 210 may calibrate the lidar sensors thereof. For example, the lane lines 220, 230, and 240 may be used by various optimization algorithms to provide a reference to which all lidars are aligned. Since lidar data is sparse (a set of points) it is difficult to align one lidar with another. In the example embodiments, the lane lines 220, 230, and 240 are estimated in virtual space and can easily be used to align points to these lane lines 220, 230, and 240, which results in alignment between lidars. In operation, the vehicle may estimate the lane lines and perform the lidar calibrations simultaneously. The calibration may modify one or more of a position and an orientation of the lidar sensors so that they are aligned with one another. During the calibration, the vehicle 210 (vehicle's computer) may use the lane lines 220, 230, and 240, as targets (stationary targets) to which the lidar points can be aligned thereby aligning the respective lidar sensors with one another.

Figure 3A:
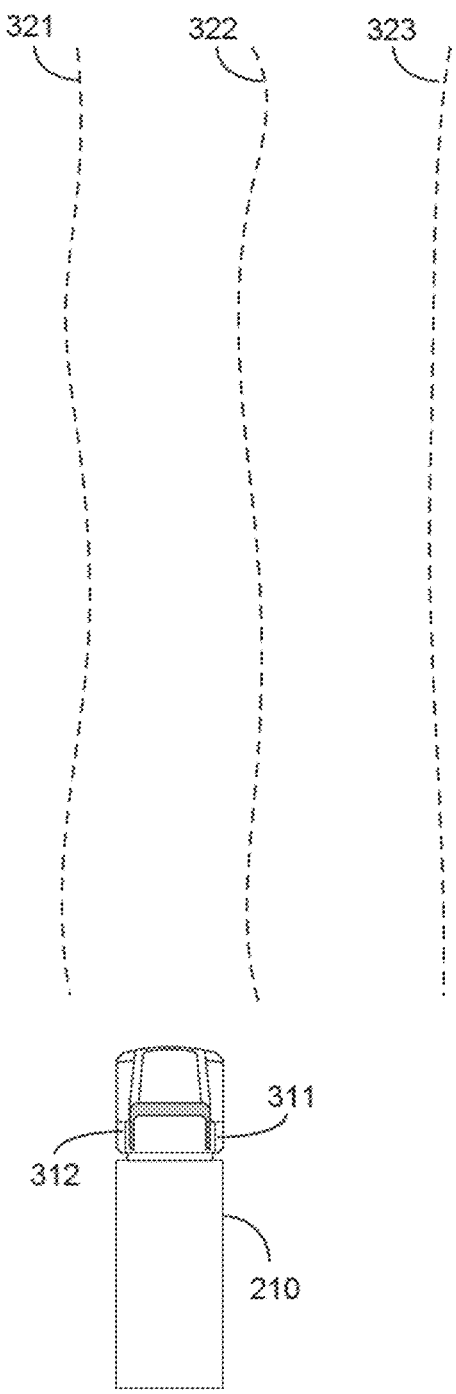
FIG. 3A is a diagram illustrating a process of capturing images of lane lines in accordance with an example embodiment.

FIG. 3A illustrates a process 300A of the vehicle 210 capturing images of lane lines 321, 322, and 323, based on image data (e.g., still images, video, etc.) captured by cameras 311 and 312 of the vehicle 210 while the vehicle is travelling down the road. It should be appreciated that the images of the lane lines 321, 322, and 323 may be captured at the same time as the lidar points 212 are captured in FIG. 2A. That is, the images of the lane lines 321, 322, and 323 may be captured of the same location of the road as the lidar points 212. The images may be stored within a memory of the vehicle's computer. The images may be referred to as camera segmentations of lane lines.

Figure 3B:
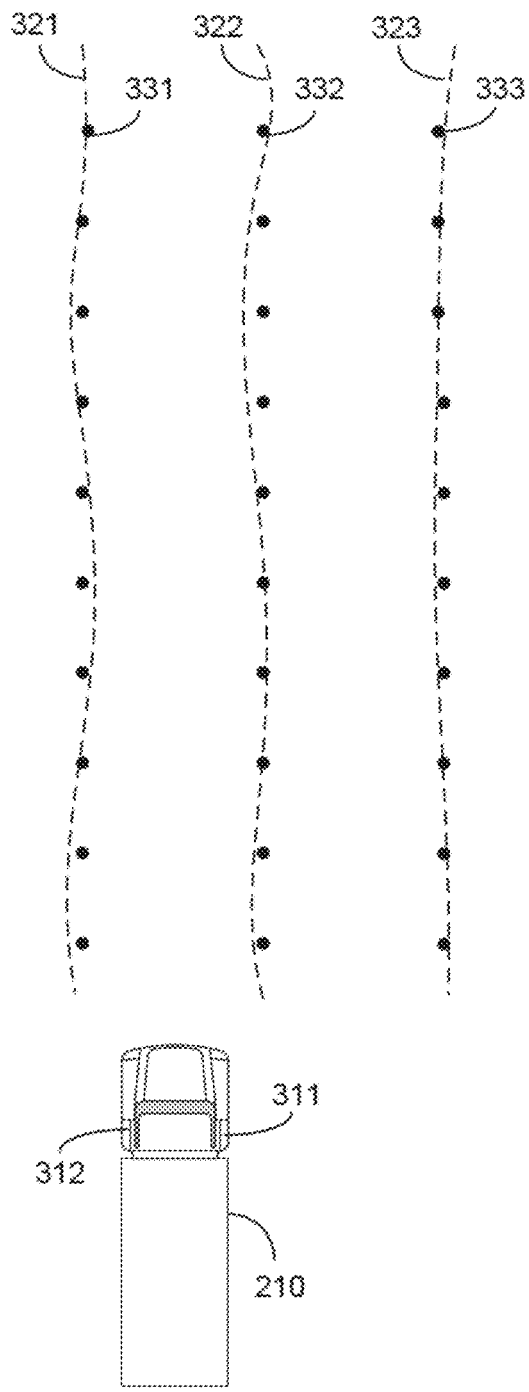
FIG. 3B is a diagram illustrating a process of calibrating a camera of a vehicle in accordance with an example embodiment.

FIG. 3B illustrates a process 300B of calibrating cameras 311 and 312 of the vehicle 210 in accordance with an example embodiment. In addition to calibrating the lidar sensors as described above, the vehicle 210 may also calibrate the cameras 311 and 312 based on the lane lines 220, 230, and 240 estimated from the lidar points. Referring to FIG. 3B, the cameras 311 and 312 may be calibrated by projecting calibrated lidar points 331, 332, and 333, corresponding to the lane lines 220, 230, and 240 from the lidar data shown in FIG. 2D, into the images of the lane lines 321, 322, and 323, and scoring their alignment to the lane lines 321, 322, and 323, in the images. In this example, the calibration process relies on calibrating lidars first in order to properly calibrate the camera, second. In operation, both calibrations may be performed simultaneously.

To project the lidar points 331, 332, and 333 into the image, the vehicle 210 may use one or more transform operations The distance transform may be used to build a lookup image which tells the system how far each pixel is from a lane segmentation pixel. The vehicle 210 can then use this lookup image to score projected lidar points. The optimization framework may aim to adjust the calibration parameters to minimize the score.

The lidar points 331, 332, and 332, corresponding to the lane lines 220, 230, and 240, from in front of the vehicle 210 may be projected into the image where the images of the lane lines 321, 322, and 323 are shown. According to various embodiments, the vehicle 210 may measure a distance between the image of the lane lines 321, 322, and 323, and the lidar points 331, 332, and 333 using the distance transform. In response, the vehicle may adjust one or more of an orientation, a location, an angle, etc., of the cameras and/or the lidar sensors in order to align the sensor readings of the cameras and the lidars to each other and thereby improve the computer vision/perception of the vehicle 210.

It should be appreciated that the calibration is not tied to the road. In other words, the calibration process using a specific portion of road as a calibration target, calibrates the cameras and the lidars for any portion of road, not just the specific portion of the road that is used as the calibration target.

Figure 3C:
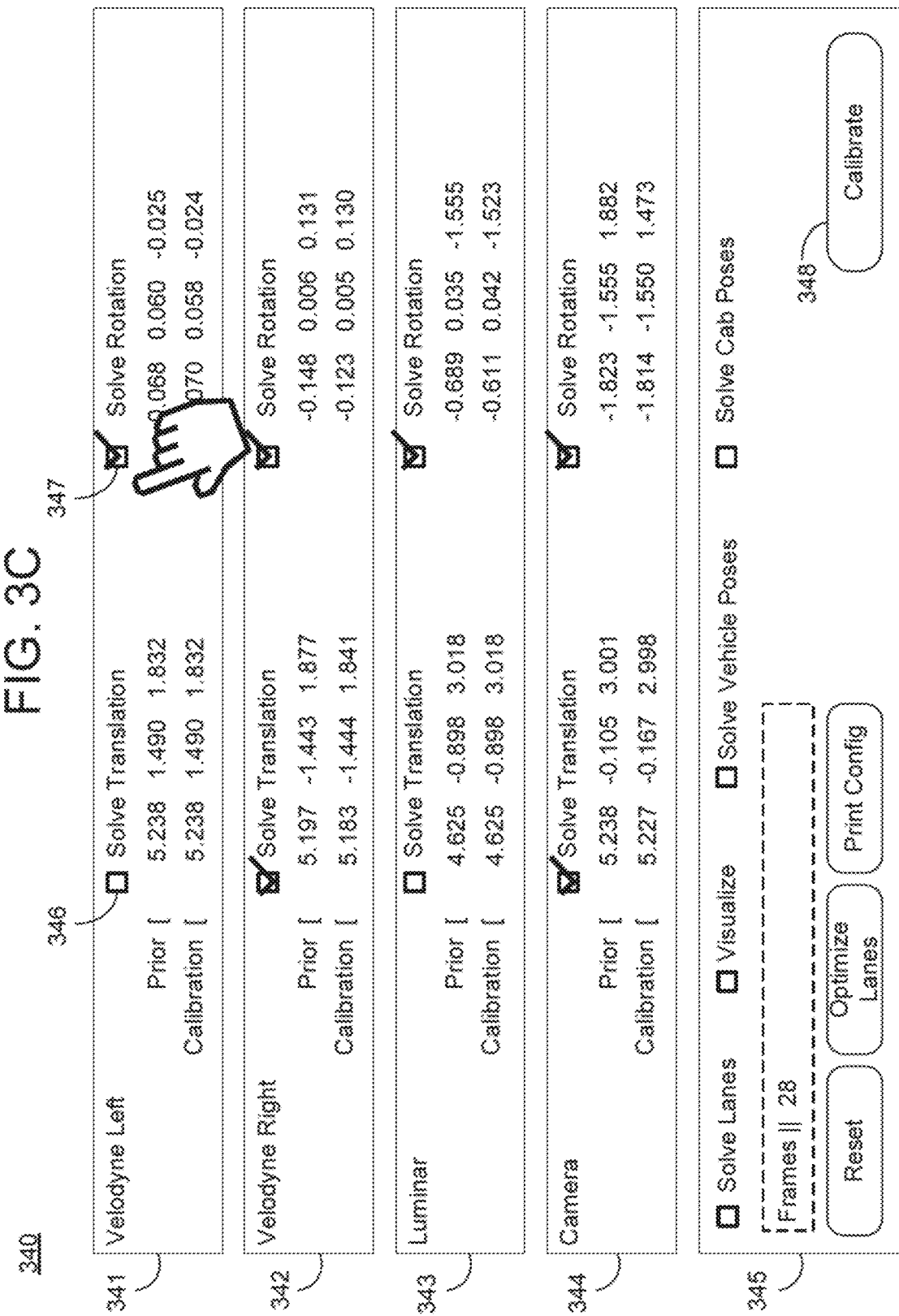
FIG. 3C is a diagram illustrating a user interface showing calibration results in accordance with an example embodiment.

FIG. 3C illustrates a user interface 340 showing calibration results in accordance with an example embodiment. Referring to FIG. 3C, the user interface 340 shows the results of the calibration process performed on the cameras and the lidars. Here, the user interface 340 may be output to a remote user device, for example, a web server, a cloud platform, a terminal, or the like. The vehicle may be an autonomous vehicle (unmanned) while the calibration results may be output to a user device that is remote from the vehicle.

The user interface 340 includes a plurality of status bars 341, 342, 343, and 344, representing the calibration status of a plurality of sensor including three lidar sensors (represented by status bars 341, 342, and 343) and a camera represented by status bar 344. The status bars 341-344 each identify which attribute is calibrated for along with an amount of calibration. For example, the status bar 341 indicates that only rotation was calibrated as indicated by a checked box 347 while the translation was not calibrated as indicated by an unchecked box 346. In addition to the statuses of the individual sensors, the user interface 340 also includes an additional data bar 345 with additional information about the calibration including a number of frames of sensor data that have been captured and used for the calibration, and additional options that can be selected by the user. Furthermore, the user interface 340 may offer a button 348 which allows the user to calibrate the vehicle on-demand by pressing on the button 348.

FIG. 4 illustrates a method 400 for calibrating vehicle sensors from on-road sensor data in accordance with an example embodiment. As an example, the method 400 may be performed by a vehicle's computer, a network-connected server, a user device, a cloud platform, or the like. Referring to FIG. 4, in 410, the method may include receiving sensor data captured by sensors of a vehicle in motion on a road. For example, the sensor data may include image data captured by one or more cameras of the vehicle and lidar points captured by one or more lidar sensors of the vehicle. The sensor data may be stored within a memory device of the vehicle.

In 420, the method may include identifying lane line data points within the sensor data which corresponds to lane lines of the road on which the vehicle is travelling. Here, the lane lines may be identified using lidar data points from a lidar point cloud that are nearest to an expected lane line. In 430, the method may include generating a multi-dimensional representation which includes positions of a plurality of lane lines of the road based on the identified lane line data points. For example, the multi-dimensional representation may include a three-dimensional (3D) image of the lane lines in a virtual space where the lane lines are formed by polylines of lidar data points. In 440, the method may include calibrating a sensor from the sensors of the vehicle based on the multi-dimensional representation of the plurality of lane lines.

In some embodiments, the calibrating may include aligning one or more of a rotation and a translation of the plurality of lidar sensors of the vehicle with respect to each other based on the plurality of polylines representing the plurality of lane lines within the three-dimensional representation of the road. In some embodiments, the generating may further include projecting the plurality of polylines representing the plurality of lane lines into a two-dimensional image of the road captured by a camera of the vehicle, and calibrating the camera of the vehicle based on the projected plurality of lane lines in the image of the road. Here, the location or positions of the lane lines in the image may be previously labeled because it is a segmentation image. Each pixel of the raw image may be labeled with one of many categories by a deep neural network. For example, each of the ground, lanes, barriers, poles, signs, etc. may have different labels. The resulting segmentation image carries an integer per pixel representing the category.

In some embodiments, the method may further include selecting a plurality of data points from the sensor data around the vehicle and within a predetermined distance from a ground, and estimating a ground flatness of the road around the vehicle based on the selected plurality of data points. In some embodiments, the calibrating may further include calibrating the sensor based on the estimated ground flatness of the road around the vehicle. In some embodiments, the calibrating may include executing an optimization associated with one or more of an odometry, a cab-to-cab transform, a lidar to lane line projection, a lane curvature, a lidar to camera projection, and a lidar to ground plane flatness, based on the multi-dimensional representation of the plurality of lane lines. In some embodiments, the calibrating may include simultaneously generating the multi-dimensional representation which includes positions of a plurality of lane lines of the road based on the identified lane line data points and calibrating the sensor based on the multi-dimensional representation.

Figure 5:
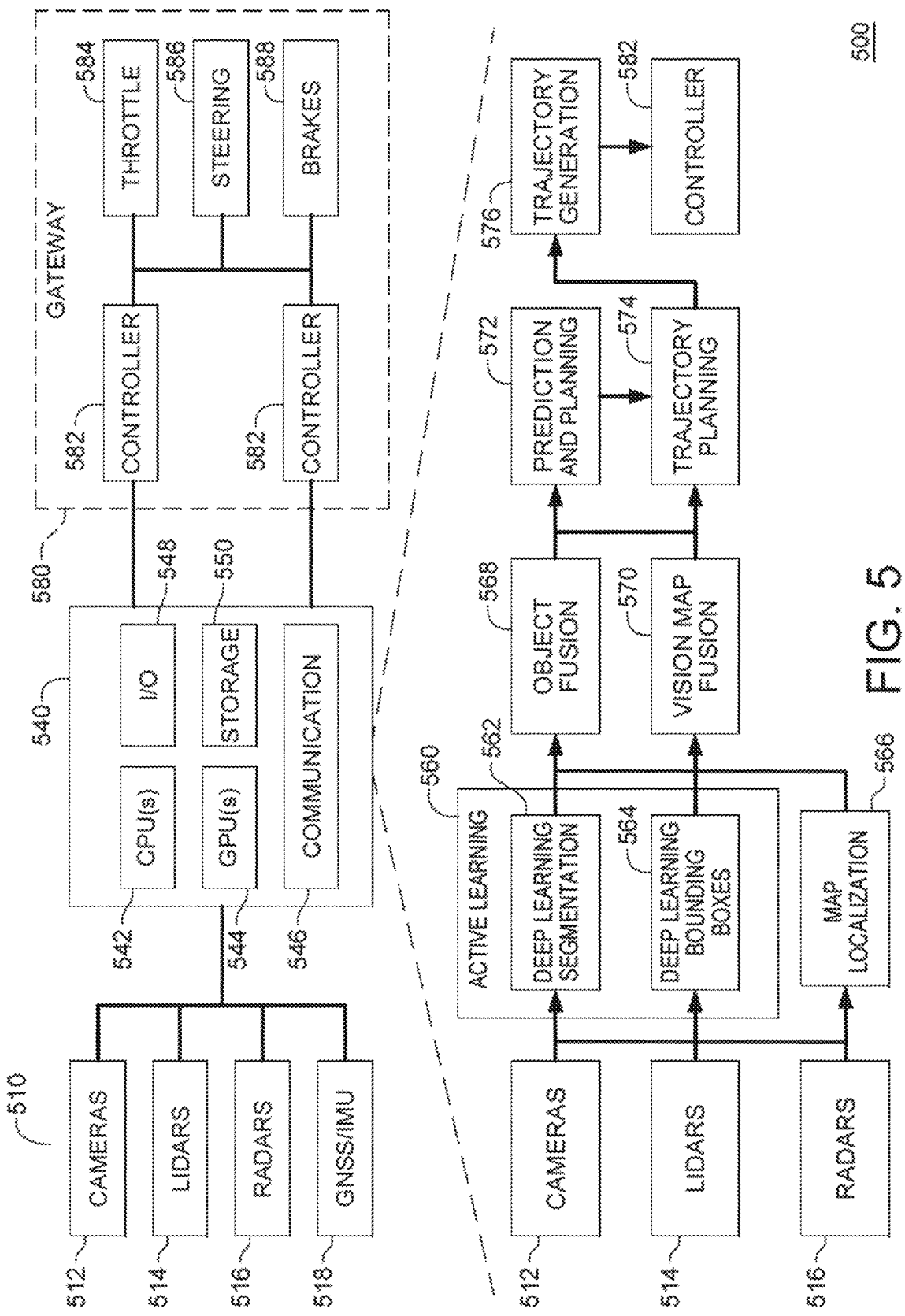
FIG. 5 is a diagram illustrating a control system that may be deployed in a vehicle such as the semi-truck depicted in FIGS. 6A-6C, in accordance with an example embodiment.
Figure 6A:
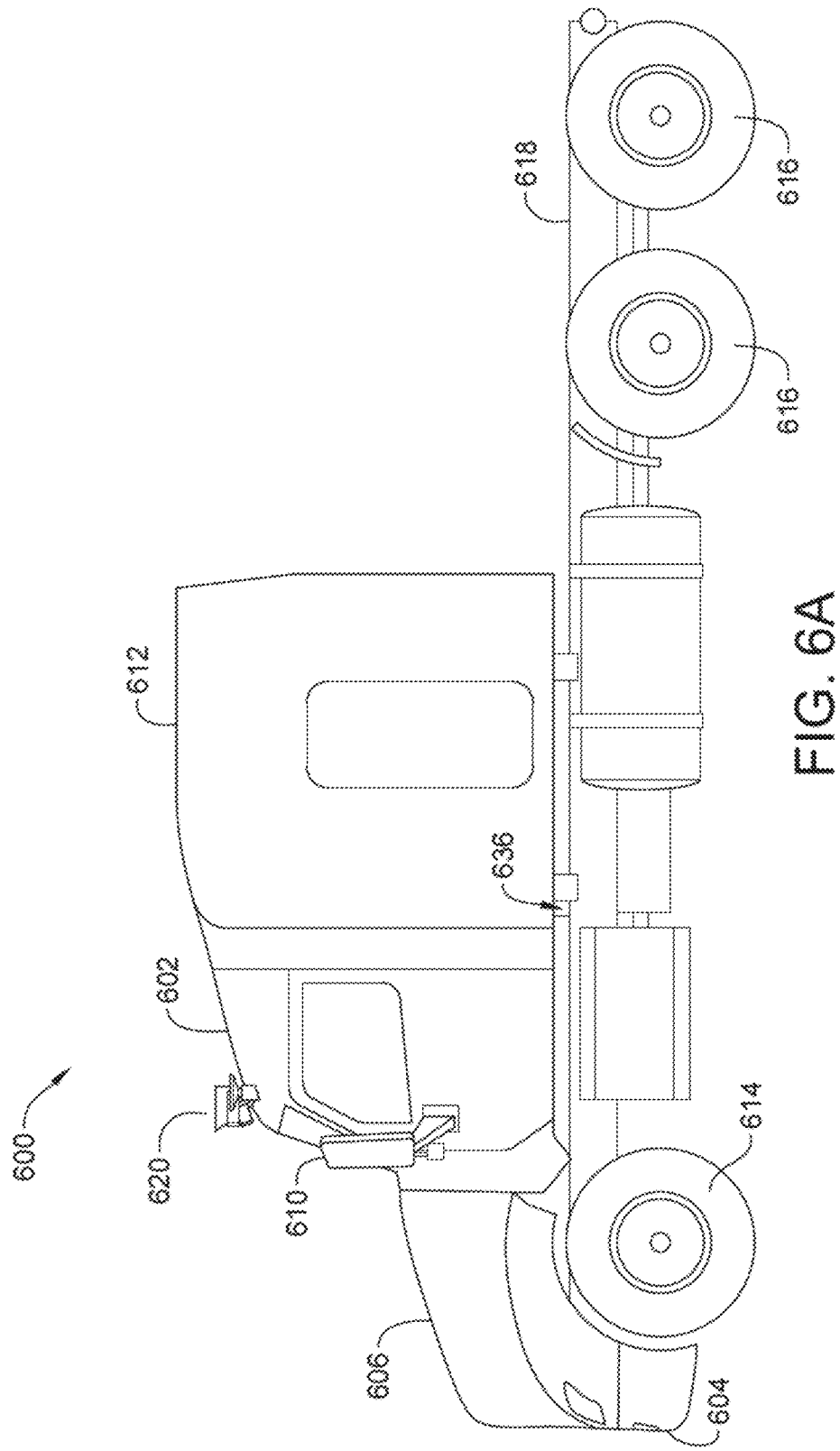
FIGS. 6A-6C are diagrams illustrating exterior views of a semi-truck that may be used in accordance with example embodiments.
Figure 6B:
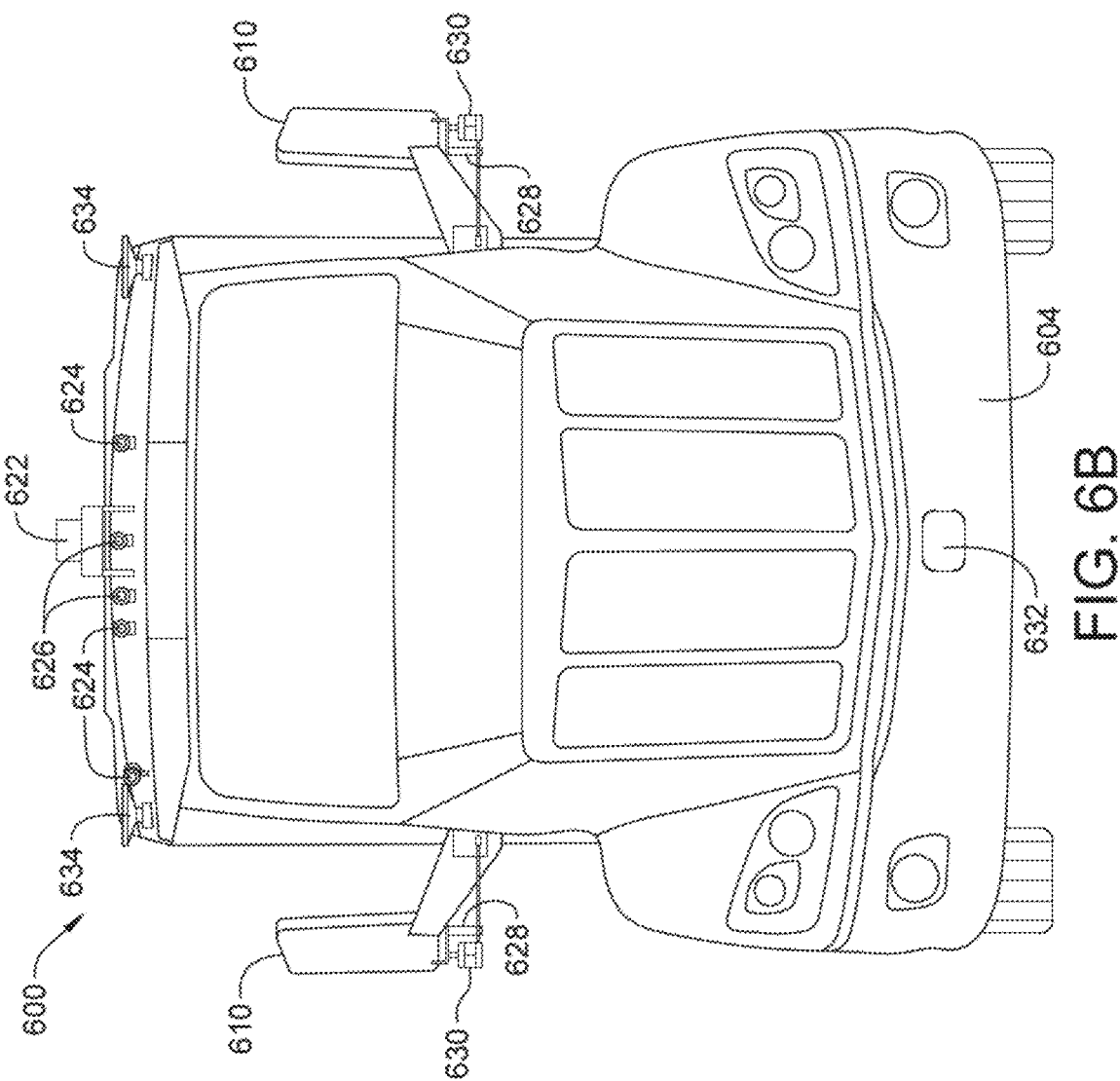
Figure 6C:
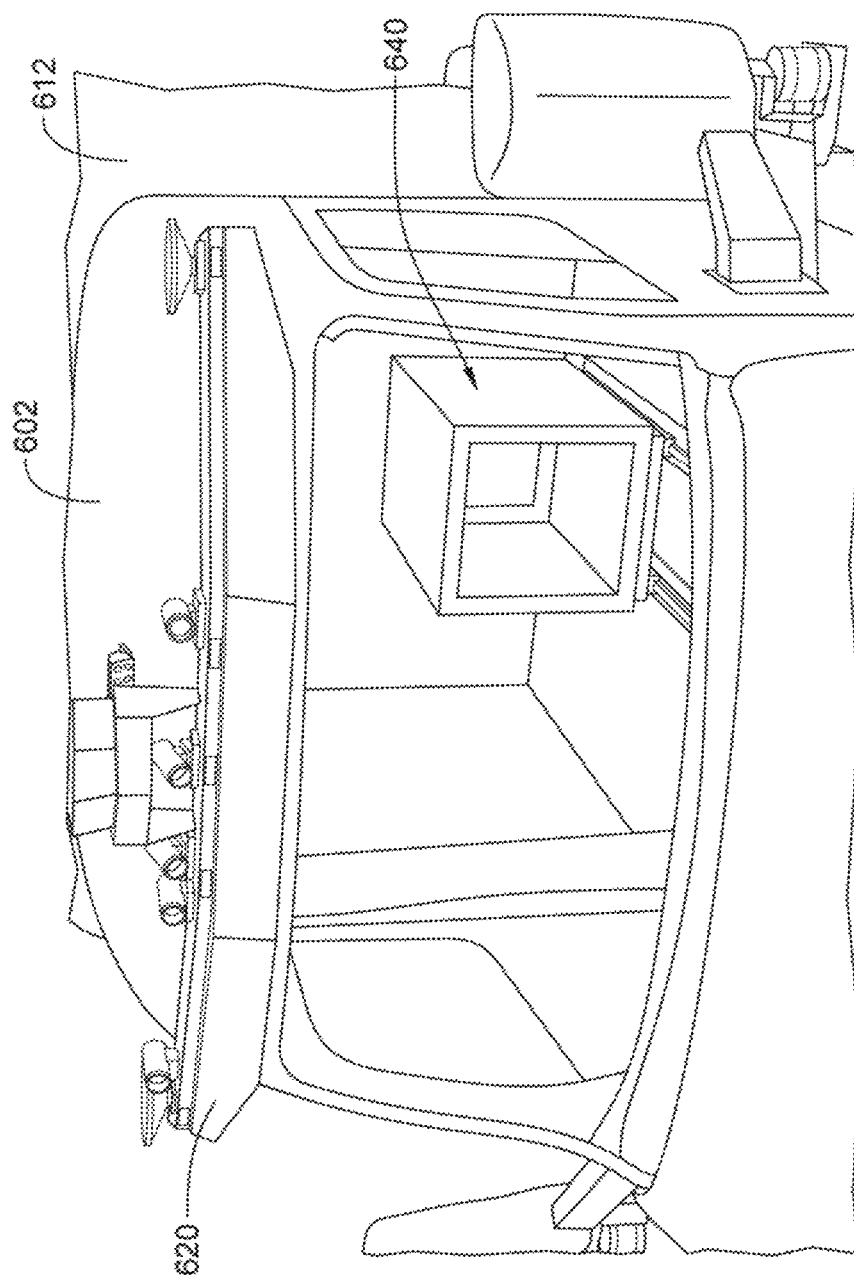

FIG. 5 illustrates a control system 500 that may be deployed in a vehicle such as the semi-truck 600 depicted in FIGS. 6A-6C, in accordance with an example embodiment. Referring to FIG. 5, the control system 500 may include a number of sensors 510 which collect data and information provided to a central computer system 540 to perform operations including, for example, control operations which control components of the vehicle via a gateway 580. Pursuant to some embodiments, the gateway 580 is configured to allow the central computer system 540 to control a number of different components from different manufacturers.

The central computer system 540 may be configured with one or more central processing units (CPUs) 542 to perform processing including processing to implement features of embodiments of the present invention as described elsewhere herein as well as to receive sensor data from sensors 510 for use in generating control signals to control one or more actuators or other controllers associated with systems of the vehicle (including, for example, actuators or controllers allowing control of a throttle 584, steering systems 586, brakes 588 or the like). In general, the control system 500 may be configured to operate the semi-truck 600 in an autonomous (or semi-autonomous) mode of operation.

For example, the control system 500 may be operated to capture images from one or more cameras 512 mounted on various locations of the semi-truck 600 and perform processing (such as image processing) on those images to identify objects proximate or in a path of the semi-truck 600. Further, one or more lidar 514 and radar 516 sensors may be positioned to sense or detect the presence and volume of objects proximate or in the path of the semi-truck 600. Other sensors may also be positioned or mounted on various locations of the semi-truck 600 to capture other information such as position data. For example, the sensors may include one or more satellite positioning sensors and/or inertial navigation systems such as GNSS/IMU 518. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 518 sensors may be used in conjunction with features of the present invention. The data collected by each of these sensors may be processed by the computer system 540 to generate control signals that control the operation of the semi-truck 600. The images and location information may be processed to identify or detect objects around or in the path of the semi-truck 600 and control signals may be emitted to adjust the throttle 584, steering 586 or brakes 588 as needed to safely operate the semi-truck 600. While illustrative example sensors and actuators or vehicle systems are shown in FIG. 5, those skilled in the art, upon reading the present disclosure, will appreciate that other sensors, actuators or systems may also be used. For example, in some embodiments, actuators to allow control of the transmission of the semi-truck 600 may also be provided.

The control system 500 may include a computer system 540 (such as a computer server) which is configured to provide a computing environment in which one or more software or control applications (such as items 560-582) may be executed to perform the processing described herein. In some embodiments, the computer system 540 includes components which are deployed on a semi-truck 600 (e.g., they may be deployed in a systems rack 640 positioned within a sleeper compartment 612 as shown in FIG. 6C). The computer system 540 may be in communication with other computer systems (not shown) that may be remote from the semi-truck 600 (e.g., the computer systems may be in communication via a network connection).

According to various embodiments described herein, the computer system 540 may be implemented as a server. In some embodiments, the computer system 540 may configured using any of a number of well-known computing systems, environments, and/or configurations such as, but not limited to, personal computer systems, cloud platforms, server computer systems, thin clients, thick clients, handheld or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 540 and the control system 500. For example, as shown, applications may be provided which perform active learning machine processing (active learning component 560) to process images captured by one or more cameras 512 and information obtained by lidars 514. For example, image data may be processed using deep learning segmentation models 562 to identify objects of interest in those images (such as, for example, other vehicles, construction signs, etc.). Here, deep learning segmentation may be used to identity lane points within the lidar scan. As an example, the system may use an intensity based voxel filter to identify lane points within the lidar scan.

Lidar data may be processed by the machine learning applications 564 to draw or identify bounding boxes on image data to identify objects of interest located by the lidar sensors. Information output from the machine learning applications may be provided as inputs to object fusion 568 and vision map fusion 570 software components which may perform processing to predict the actions of other road users and to fuse local vehicle poses with global map geometry in real-time, enabling on-the-fly map corrections. The outputs from the machine learning applications may be supplemented with information from Radars 516 and map localization 566 application data (as well as with positioning data). These applications allow the control system 500 to be less map reliant and more capable of handling a constantly changing road environment. Further, by correcting any map errors on the fly, the control system 500 can facilitate safer, more scalable and more efficient operations as compared to alternative map-centric approaches. Information is provided to prediction and planning application 572 which provides input to trajectory planning 574 components allowing a trajectory 576 to be generated in real time based on interactions and predicted interactions between the semi-truck 600 and other relevant vehicles in the environment. In some embodiments, for example, the control system 500 generates a sixty second planning horizon, analyzing relevant actors and available trajectories. The plan that best fits multiple criteria (including safety, comfort and route preferences) is selected and any relevant control inputs needed to implement the plan are provided to controllers 582 to control the movement of the semi-truck 600.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 5 illustrates an example computer system 540 which may represent or be integrated in any of the above-described components, etc. FIG. 5 is not intended to suggest any limitation as to the scope of use or functionality of embodiments of the application described herein. The computer system 540 is capable of being implemented and/or performing any of the functionality set forth hereinabove.

The computer system 540 may be described in the general context of computer system-executable instructions, such as program modules, being executed by a computer system. Generally, program modules may include routines, programs, objects, components, logic, data structures, and so on that perform particular tasks or implement particular abstract data types. The computer system 540 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 540 is shown in the form of a general-purpose computing device. The components of the computer system 540 may include, but are not limited to, one or more processors (such as CPUs 542 and GPUs 544), a communication interface 546, one or more input/output interfaces 548 and one or more storage devices 550. Although not shown, the computer system 540 may also include a system bus that couples various system components including system memory to the CPUs 542. In some embodiments, the input/output interfaces 548 may also include a network interface. For example, in some embodiments, some or all of the components of the control system 500 may be in communication via a controller area network ("CAN") bus or the like.

The storage device 550 may include a variety of types and forms of computer readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 550 can read and write to a non-removable, non-volatile magnetic media (not shown and typically called a "hard drive"). Although not shown, the storage device 550 may include one or more removable non-volatile disk drives such as magnetic, tape or optical disk drives. In such instances, each can be connected to the bus by one or more data media interfaces. Storage device 550 may include at least one program product having a set (e.g., at least one) of program modules that are configured to carry out the functions of various embodiments of the application.

FIGS. 6A-6C are diagrams illustrating exterior views of a semi-truck 600 that may be used in accordance with example embodiments. Referring to FIGS. 6A-6C, the semi-truck 600 is shown for illustrative purposes only—those skilled in the art, upon reading the present disclosure, will appreciate that embodiments may be used in conjunction with a number of different types of vehicles. The example semi-truck 600 shown in FIGS. 6A-6C is one configured in a common North American style which has an engine 606 forward of a cab 602, a steering axle 614 and two drive axles 616. A trailer (not shown) is attached to the semi-truck 600 via a fifth-wheel trailer coupling that is provided on a frame 618 positioned over the drive axles 616. A sleeper compartment 612 is positioned behind the cab 602. A number of sensors are positioned on different locations of the semi-truck 600. For example, sensors may be mounted on a roof of the cab 602 on a sensor rack 620. Sensors may also be mounted on side mirrors 610 as well as other locations. As will be discussed, sensors may be mounted on the bumper 604 as well as on the side of the cab 602 or other locations. For example, a rear facing radar 636 is shown as mounted on a side of the cab 602 in FIG. 6A. Embodiments may be used with other configurations of trucks or other vehicles (e.g., such as semi-trucks having a cab over or cab forward configuration or the like). In general, and without limiting embodiments of the present invention, features of the present invention may be used with desirable results in vehicles that carry cargo over long distances, such as long-haul semi-truck routes.

FIG. 6B is a front view of the semi-truck 600 and illustrates a number of sensors and sensor locations. The sensor rack 620 may secure and position several sensors including a long range lidar 622, long range cameras 624, GPS antennas 634, and mid-range front facing cameras 626. The side mirrors 610 may provide mounting locations for rear-facing cameras 628 and mid-range lidar 630. A front radar 632 may be mounted on the bumper 604. Other sensors may be mounted or installed on other locations—the locations and mounts depicted in FIGS. 6A-6C are for illustrative purposes only. Referring now to FIG. 6C, a partial view of the semi-truck 600 is shown which shows an interior of the cab 602 and the sleeper compartment 612. In some embodiments, portions of the control system 500 of FIG. 5 are deployed in a systems rack 640 in the sleeper compartment 612, allowing easy access to components of the control system 500 for maintenance and operation.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a memory of a vehicle configured to store sensor data associated with a road that is captured by one or more of a first type of sensor of the vehicle while the vehicle is travelling on the road; and
   a processor configured to, while the vehicle is travelling on the road:
   identify lane line data points within the sensor data that corresponds to lane lines of the road the vehicle is travelling;
   generate a three-dimensional (3D) virtual representation that includes positions of a plurality of lane lines of the road based on the identified lane line data points; and
   adjust a calibration parameter of, at least, a sensor from the one or more of the first type of sensor of the vehicle based on an alignment of the 3D virtual representation of the plurality of lane lines and sensor data associated with the data captured by one or more of the first type of sensor of the vehicle.

2. The computing system of claim 1, wherein the processor generated 3D virtual representation of the road includes the plurality of lane lines.

3. The computing system of claim 1, wherein the sensor data comprises lidar data from a plurality of the first type of sensor being lidar sensors and the processor is configured to generate one or more polylines representing the plurality of lane lines.

4. The computing system of claim 3, wherein the processor is configured to adjust one or more of a rotation and a translation of a sensor from the plurality of lidar sensors of the vehicle based on reference information from one or more other lidar sensors and based on the one or more polylines that represent the plurality of lane lines.

5. The computing system of claim 3, wherein the processor is configured to project the one or more polylines that represent the plurality of lane lines into a two-dimensional image of the road captured by a second type of sensor of the vehicle with specified locations of the plurality of lane lines, and calibrate the second type of sensor based on the projected plurality of lane lines in the image of the road.

6. The computing system of claim 1, wherein the processor is further configured to select a plurality of data points from the sensor data associated with a plurality of locations on or around the vehicle located at a predetermined distance above the ground, and estimate a cab motion of the vehicle based on the selected plurality of data points.

7. The computing system of claim 6, wherein the processor is further configured to adjust calibration parameters of the sensor based on the estimated ground flatness of the road around the vehicle.

8. The computing system of claim 1, wherein the processor is configured to execute an optimization associated with one or more of an odometry, a cab-to-cab transform, a lidar to lane line projection, a lane curvature, a lidar to camera projection, and a cab to ground transform of an estimated ground plane measured by one or more sensors of the first type of sensor, based on the representation of the plurality of lane lines.

9. The computing system of claim 1, wherein the processor is configured to simultaneously generate the representation of the plurality of lane lines, and calibrate the sensor based on the representation.

10. A method comprising:
    receiving sensor data associated with a road captured by one or more of a first type of sensor of a vehicle while the vehicle is travelling on the road;
    identifying, by a processor of the vehicle while the vehicle is travelling on the road, lane line data points within the sensor data that corresponds to lane lines of the road the vehicle is travelling;
    generating, by the processor, a three-dimensional (3D) virtual representation that includes positions of a plurality of lane lines of the road based on the identified lane line data points; and
    adjusting, by the processor, a calibration parameter of, at least, a sensor from among the one or more of the first type of sensor of the vehicle based on an alignment of the 3D virtual representation of the plurality of lane lines and sensor data associated with the data captured by one or more of the first type of sensor of the vehicle.

11. The method of claim 10, wherein the generated 3D virtual representation of the road that includes the plurality of lane lines.

12. The method of claim 10, wherein the sensor data comprises lidar data from a plurality of the first type of sensor being lidar sensors and the generating comprises generating one or more polylines representing the plurality of lane lines.

13. The method of claim 12, wherein the adjusting comprises adjusting one or more of a rotation and a translation of a sensor from the plurality of lidar sensors of the vehicle based on reference information from one or more other lidar sensors and based on the one or more polylines representing the plurality of lane lines.

14. The method of claim 12, wherein the generating further comprises projecting the one or more polylines representing the plurality of lane lines into a two-dimensional image of the road captured by a second type of sensor of the vehicle with specified locations of the plurality of lane lines, and calibrating the second type of sensor of the vehicle based on the projected plurality of lane lines in the image of the road.

15. The method of claim 10, further comprising selecting a plurality of data points from the sensor data associated with a plurality of locations on or around the vehicle located at a predetermined distance above the ground, and estimating a cab motion of the vehicle based on the selected plurality of data points.

16. The method of claim 15, wherein the adjusting further comprises adjusting calibration parameters of the sensor based on the estimated ground flatness of the road around the vehicle.

17. The method of claim 10, wherein the calibrating comprises executing an optimization associated with one or more of an odometry, a cab-to-cab transform, a lidar to lane line projection, a lane curvature, a lidar to camera projection, and a cab to ground transform of an estimated ground plane measured by one or more sensors of the first type of sensor, based on the representation of the plurality of lane lines.

18. The method of claim 10, wherein the calibrating comprises simultaneously generating the representation which of the plurality of lane lines and calibrating the sensor based on the representation.

19. A vehicle comprising:
   one or more sensors of a first type of sensor;
   a memory configured to store sensor data associated with a road that is captured by the one or more of the first type of sensor while the vehicle is in motion travelling on the road; and
   a processor configured to generate a three-dimensional (3D) virtual calibration target from the sensor data associated with the road while the vehicle is in motion and adjust a calibration parameter of, at least, a sensor from among the one or more of the first type of sensor based on an alignment of the generated calibration target and sensor data associated with the data captured by one or more of the first type of sensor of the vehicle.

20. The vehicle of claim 17, wherein the processor is configured to generate the 3D virtual calibration target based on lidar points that are sensed of the road by the vehicle while the vehicle is travelling on the road.

* * * * *